(12) United States Patent
Gao (10) Patent No.: US 7,492,482 B2
(45) Date of Patent: Feb. 17, 2009

(54) IMAGE PROCESSING APPARATUS, IMAGE PROCESSING METHOD AND IMAGE PROCESSING PROGRAM

(75) Inventor: Qing Gao, Hino (JP)

(73) Assignee: Konica Minolta Holdings, Inc. (JP)

( * ) Notice: Subject to any disclaimer, the term of this patent is extended or adjusted under 35 U.S.C. 154(b) by 790 days.

(21) Appl. No.: 11/013,832

(22) Filed: Dec. 16, 2004

(65) Prior Publication Data

US 2005/0140998 A1      Jun. 30, 2005

(30) Foreign Application Priority Data

Dec. 25, 2003      (JP)      ............................. 2003-431253

(51) Int. Cl.
*G06K 15/00*      (2006.01)
*G06K 9/38*      (2006.01)
*H04N 1/40*      (2006.01)
*H04N 1/46*      (2006.01)
*G09G 5/02*      (2006.01)
*G06F 15/00*      (2006.01)

(52) U.S. Cl. ...................... 358/3.13; 358/1.9; 358/3.01; 358/3.06; 358/3.16; 358/534; 382/270; 345/596

(58) Field of Classification Search ................... 358/1.9, 358/3.01, 3.06, 3.13–3.2, 534–536, 521, 358/530, 540; 382/270, 162, 166, 252, 254; 345/296

See application file for complete search history.

(56) References Cited

U.S. PATENT DOCUMENTS 5,973,803 A * 10/1999 Cheung et al. .............. 358/534
6,069,609 A * 5/2000 Ishida et al. ................ 345/596
6,654,146 B1 * 11/2003 Inoue ......................... 358/3.07
2002/0036665 A1 * 3/2002 Shima ............................ 347/5
2002/0196471 A1 * 12/2002 Usui et al. .................. 358/3.13
2005/0219623 A1 * 10/2005 Hiramoto et al. ........... 358/3.06

FOREIGN PATENT DOCUMENTS

| EP | 836317 A2 * | 4/1998 |
| JP | 4-328957 | 11/1992 |
| JP | 8-107500 | 4/1996 |

OTHER PUBLICATIONS

English Abstract for Japanese Patent 04-328957 dated Nov. 17, 1992.
English Abstract for Japanese Patent 08-107500 dated Apr. 23, 1996.
Dmitri A. Gusev; "Anti-Correlation Digital Halftoning" [online], Aug. 1998, Indiana University (searched on Jul. 1, 2003), Internet <URL http://www.cs.indiana.edu/cgi-bin/techreports/TRNNN.cgi?trnum=TR513>.

* cited by examiner

*Primary Examiner*—Mark K Zimmerman
*Assistant Examiner*—Mesfin Getaneh
(74) *Attorney, Agent, or Firm*—Cantor Colburn LLP

(57) ABSTRACT

An image processing apparatus having an arithmetic processing section for quantizing multi-density level image data and converting the image data into digital halftone image data for outputting. The arithmetic processing section is configured to create a plurality of quantized patterns to determined a dot occurrence information sequence, based on a given initial quantized pattern, such that anti-correlation is increased with respect to the dot occurrence information sequence for a pixel that has already been quantized; to add the plurality of quantized patterns to form a dither mask; and to quantize the multi-density level image data by using the dither mask.

6 Claims, 14 Drawing Sheets

| 18 | 20 | 21 | 6  | 5  |
|----|----|----|----|----|
| 23 | 32 | 32 | 13 | 8  |
| 32 | 45 | 64 | 32 | 13 |
| 45 | 64 | g  | 45 | 20 |
| 32 | 45 | 64 | 13 | 8  |
| 23 | 32 | 32 | 13 | 8  |
| 18 | 20 | 21 | 6  | 5  |

| Δ | P |
|---|---|
| Δ ∈ [0,13/255) | $R(K_1, 6, -5)$ |
| Δ ∈ [13/255,28/255) | $R(K_2, 6, -5)$ |
| Δ ∈ [28/255,31/255] | $R(K_3, 5+\text{rand}(0..1), -l_k+1)$ |
| Δ ∈ (31/255,45/255) | $R(K_3, 5+2\cdot\text{rand}(0..1), -l_k+1)$ |
| Δ ∈ (45/255,49/255] | $R(K_3, 5+\text{rand}(0..2), -l_k+1)$ |
| Δ ∈ (49/255,88/255) | $R(K_3, 5+\text{rand}(0..2), -1)$ |
| Δ ∈ [88/255,94/255) | $R(K_4, 5, -1)$ |
| Δ ∈ [94/255,95/255] | $R(K_4, 5+\text{rand}(0..1), -1)$ |
| Δ ∈ (95/255,100/255] | $R(K_5, 7, -2)$ |
| Δ ∈ (100/255,106/255] | $R(K_6, 7, -2)$ |
| Δ ∈ (106/255,111/255] | $R(K_6, 7, -2-\text{rand}(0..1))$ |
| Δ ∈ (111/255,120/255] | $R(K_6, 5, -3)$ |
| Δ ∈ (120/255,121/255] | $R(K_4, 6, 5)$ |
| Δ ∈ (121/255,122/255] | $R(K_4, 6+\text{rand}(0..1), -l_k+1)$ |
| Δ ∈ (122/255,1] | $R(K_4, [255\Delta]-116, -l_k+1)$ |

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 1 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 0 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 14 | 16 | 20 | 4 | 3 | 3 | 2 | 2 | 1 | 1 | 1 | 1 | 0 |
| 6 | 6 | 7 | 7 | 8 | 10 | 11 | 13 | 15 | 18 | 21 | 21 | 5 | 5 | 4 | 3 | 2 | 1 | 1 | 1 | 1 | 0 |
| 6 | 6 | 7 | 8 | 9 | 10 | 12 | 14 | 18 | 28 | 34 | 45 | 16 | 6 | 5 | 3 | 2 | 2 | 1 | 1 | 1 | 1 |
| 6 | 6 | 7 | 8 | 9 | 11 | 13 | 16 | 21 | 34 | 46 | 64 | 34 | 13 | 5 | 4 | 2 | 2 | 1 | 1 | 1 | 1 |
| 6 | 6 | 7 | 8 | 9 | 11 | 13 | 20 | 21 | 44 | 50 | × | | | | | | | | | | |

K2

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 1 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 0 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 14 | 16 | 16 | 4 | 3 | 3 | 2 | 2 | 1 | 1 | 1 | 1 | 0 |
| 6 | 6 | 7 | 7 | 8 | 10 | 11 | 13 | 15 | 18 | 20 | 21 | 6 | 5 | 4 | 3 | 2 | 1 | 1 | 1 | 1 | 0 |
| 6 | 6 | 7 | 8 | 9 | 10 | 12 | 14 | 18 | 28 | 34 | 44 | 16 | 7 | 5 | 3 | 2 | 2 | 1 | 1 | 1 | 1 |
| 6 | 6 | 7 | 8 | 9 | 11 | 13 | 16 | 20 | 34 | 46 | 64 | 34 | 13 | 6 | 4 | 2 | 2 | 1 | 1 | 1 | 1 |
| 6 | 6 | 7 | 8 | 9 | 11 | 13 | 16 | 21 | 44 | 50 | × | | | | | | | | | | |

K3

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 0 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 0 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 14 | 16 | 16 | 4 | 3 | 3 | 2 | 2 | 1 | 1 | 1 | 1 | 0 |
| 6 | 6 | 7 | 7 | 8 | 10 | 11 | 13 | 15 | 18 | 20 | 21 | 6 | 5 | 4 | 3 | 2 | 1 | 1 | 1 | 1 | 0 |
| 6 | 6 | 7 | 8 | 9 | 10 | 12 | 14 | 18 | 23 | 29 | 32 | 13 | 8 | 5 | 3 | 2 | 2 | 1 | 1 | 1 | 1 |
| 6 | 6 | 7 | 8 | 9 | 11 | 13 | 16 | 20 | 29 | 45 | 64 | 32 | 13 | 6 | 4 | 2 | 2 | 1 | 1 | 1 | 1 |
| 6 | 6 | 7 | 8 | 9 | 11 | 13 | 16 | 21 | 32 | 64 | × | | | | | | | | | | |

| 4 | 4 | 5 | 5 | 5 | 5 | 5 | 5 | 6 | 6 | 6 | 6 | 1 | 1 | 0 | 0 | 0 | 0 | 0 | 0 | 0 | 0 |
|---|---|---|---|---|---|---|---|---|---|---|---|---|---|---|---|---|---|---|---|---|---|
| 4 | 5 | 5 | 5 | 5 | 5 | 6 | 6 | 6 | 6 | 6 | 6 | 1 | 1 | 1 | 1 | 1 | 0 | 0 | 0 | 0 | 0 |
| 5 | 5 | 5 | 5 | 6 | 6 | 6 | 6 | 7 | 7 | 7 | 7 | 1 | 1 | 1 | 1 | 1 | 0 | 0 | 0 | 0 | 0 |
| 5 | 5 | 5 | 6 | 6 | 6 | 7 | 7 | 7 | 8 | 8 | 8 | 1 | 1 | 1 | 1 | 1 | 1 | 1 | 0 | 0 | 0 |
| 5 | 5 | 6 | 6 | 6 | 7 | 7 | 8 | 8 | 9 | 9 | 9 | 1 | 1 | 1 | 1 | 1 | 1 | 1 | 0 | 0 | 0 |
| 5 | 5 | 6 | 6 | 7 | 8 | 8 | 9 | 10 | 10 | 11 | 11 | 2 | 2 | 1 | 1 | 1 | 1 | 1 | 1 | 0 | 0 |
| 5 | 6 | 6 | 7 | 7 | 8 | 9 | 10 | 11 | 12 | 13 | 13 | 2 | 2 | 2 | 2 | 1 | 1 | 1 | 1 | 1 | 0 |
| 5 | 6 | 6 | 7 | 8 | 9 | 10 | 11 | 13 | 20 | 16 | 16 | 4 | 3 | 3 | 2 | 2 | 1 | 1 | 1 | 1 | 0 |
| 6 | 6 | 7 | 7 | 8 | 10 | 11 | 13 | 15 | 18 | 20 | 21 | 6 | 5 | 4 | 3 | 2 | 1 | 1 | 1 | 1 | 0 |
| 6 | 6 | 7 | 8 | 9 | 10 | 12 | 20 | 18 | 23 | 32 | 32 | 13 | 8 | 5 | 3 | 2 | 2 | 1 | 1 | 1 | 1 |
| 6 | 6 | 7 | 8 | 9 | 11 | 13 | 16 | 20 | 32 | 45 | 64 | 32 | 13 | 6 | 4 | 2 | 2 | 1 | 1 | 1 | 1 |
| 6 | 6 | 7 | 8 | 9 | 11 | 13 | 16 | 21 | 32 | 64 | × | | | | | | | | | | |

K5

| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 2 | 2 | 2 | 1 | 1 | 1 | 1 | 1 | 1 | 1 | 1 | 1 | 1 |
| 1 | 1 | 1 | 1 | 1 | 1 | 1 | 1 | 2 | 5 | 7 | 8 | 2 | 1 | 1 | 1 | 1 | 1 | 1 | 1 | 1 | 1 |
| 1 | 1 | 1 | 1 | 1 | 1 | 1 | 2 | 5 | 17 | 26 | 26 | 6 | 3 | 1 | 1 | 1 | 1 | 1 | 1 | 1 | 1 |
| 1 | 1 | 1 | 1 | 1 | 1 | 1 | 2 | 7 | 26 | 45 | 64 | 24 | 5 | 2 | 1 | 1 | 1 | 1 | 1 | 1 | 1 |
| 1 | 1 | 1 | 1 | 1 | 1 | 1 | 2 | 8 | 26 | 64 | × | | | | | | | | | | |

K6

| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 2 | 2 | 2 | 1 | 1 | 1 | 1 | 1 | 1 | 1 | 1 | 1 | 1 |
| 1 | 1 | 1 | 1 | 1 | 1 | 1 | 1 | 2 | 5 | 7 | 6 | 2 | 1 | 1 | 1 | 1 | 1 | 1 | 1 | 1 | 1 |
| 1 | 1 | 1 | 1 | 1 | 1 | 1 | 2 | 6 | 17 | 26 | 26 | 6 | 3 | 1 | 1 | 1 | 1 | 1 | 1 | 1 | 1 |
| 1 | 1 | 1 | 1 | 1 | 1 | 1 | 2 | 7 | 26 | 45 | 64 | 24 | 5 | 2 | 1 | 1 | 1 | 1 | 1 | 1 | 1 |
| 1 | 1 | 1 | 1 | 1 | 1 | 1 | 2 | 5 | 26 | 64 | × | | | | | | | | | | |

FIG. 13

| R (K6, 4, -1) | 2 | 5 | 7 | 6 | 2 | 0 | 0 |
|---|---|---|---|---|---|---|---|
| | 6 | 17 | 26 | 26 | 6 | 0 | 0 |
| | 7 | 26 | 45 | 64 | 24 | 0 | 0 |
| | 5 | 26 | 64 | × | | | |

FIG. 14 (a)

| x1, y1 | x1, y2 | x1, y3 | x1, y4 | x1, y5 | x1, y6 | x1, y7 |
|--------|--------|--------|--------|--------|--------|--------|
| x2, y1 | x2, y2 | x2, y3 | x2, y4 | x2, y5 | x2, y6 | x2, y7 |
| x3, y1 | x3, y2 | x3, y3 | x3, y4 | x3, y5 | x3, y6 | x3, y7 |
| x4, y1 | x4, y2 | x4, y3 | ×      |        |        |        |

FIG. 14 (b)

| P x1, y1 | P x1, y2 | P x1, y3 | P x1, y4 | P x1, y5 | P x1, y6 | P x1, y7 |
|----------|----------|----------|----------|----------|----------|----------|
| P x2, y1 | P x2, y2 | P x2, y3 | P x2, y4 | P x2, y5 | P x2, y6 | P x2, y7 |
| P x3, y1 | P x3, y2 | P x3, y3 | P x3, y4 | P x3, y5 | P x3, y6 | P x3, y7 |
| P x4, y1 | P x4, y2 | P x4, y3 | ×        |          |          |          |

US 7,492,482 B2

IMAGE PROCESSING APPARATUS, IMAGE PROCESSING METHOD AND IMAGE PROCESSING PROGRAM

BACKGROUND OF THE INVENTION

The present invention relates to an image processing apparatus, an image processing method and an image processing program, particularly to an image processing apparatus, an image processing method and an image processing program for quantizing the multi-density level image data into digital halftone output image data.

The known prior art quantization method for converting the multi-density level original image data into digital halftone image data for outputting includes a textural dither method and an error diffusion method. Of these methods, the error diffusion method provides comparatively high image quality, and is therefore often used in high-quality application. Attempts have been made for various improvements of this method. The problem with the error diffusion method related to image quality is how to reduce the texture specified to algorithm, without amplifying a noise.

For example, attempts have been made to ensure the uniformity using a plurality of error diffusion matrices (Patent Document 1). To be more specific, two matrices are switched in response to the input value. The larger one is used in highlight or shadow area to avoid occurrence of a pattern called "worm"; whereas the smaller one is used in the intermediate area to suppress noise.

To generate more uniform results in highlight or shadow area, a threshold value dependent on an output value is used to change the threshold value (see Patent Document 2). To put it more specifically, the threshold value is changed for the surrounding pixels in response to the input, depending on whether the binary output is white or black, and this is repeatedly used for propagation.

In addition to the aforementioned prior arts, attempts have also been made to change the method of optimizing the size of the error diffusion matrix and coefficient, or the sequence of processing (direction of scanning). From these techniques, a certain effect has been achieved, but is still far from satisfactory.

Apart from the aforementioned error diffusion method, its improved version or dither method, a digital-halftoning technique based on anti-correlation has been proposed as a quantization method (Patent Document 1). According to this method, the sequence representing the information on dot occurrence (hereinafter referred to as "dot occurrence pattern") is set for each pixel, or in other words, the sequence of dot presence/absence information items in the number substantially proportional to the number of gradations constituting the relevant pixel is set for each pixel. Based on this sequence, halftoning processing is applied. In determining the contents of the dot occurrence pattern of the relevant pixel, the dot occurrence pattern already determined for the surrounding pixels is used. The expected value for the occurrence of dots in the surrounding pixels (hereinafter referred to as "histogram") is calculated for each of the element numbers of the elements constituting these dot occurrence patterns. According to this method, the dot occurrence pattern of the relevant dot is determined in such a way that, based on this expected value, the dot presence information is assigned to the element number having a smaller number of dot occurrences, on a priority basis, and a dot absence information is assigned to the element number having a greater number of dot occurrences.

According to the image processing art based on anti-correlation digital halftoning technique, when attention is paid to one particular pixel, the frequency of dot occurrence is proportional to the pixel value of that pixel. When attention is paid to a plurality of adjacent pixels, the dots for each pixel occur in such a way that the anti-correlation to the surrounding pixels is substantially the maximum. This arrangement improves the dispersion of the dots formed on the recording medium at the time of recording the image. Thus, the digital halftoning method based on anti-correlation is characterized in that specific textures observed few in the error diffusion method area.

[Patent Document 1] Official Gazette of Japanese Patent Tokkaihei 4-328957

[Patent Document 2] Official Gazette of Japanese Patent Tokkaihei 8-107500

[Non-Patent Document 1] Dmitri A. Gusev; "Anti-Correlation Digital Halftoning" [online], August 1998, Indiana University (searched on Jul. 1, 2003), Internet www.cs.indiana.edu/cgi-bin/techreports/TRNNN.cgi?trnum=TR513

However, when calculating the histogram in the image processing according to anti-correlation digital halftoning technique, it is necessary to carry but calculations in the number equivalent to "the number of chambers by matrix size" or more, then followed by the process of sorting. Accordingly, especially when the image has a great number of bits, a very long processing time is required. This has been the problem with this prior art.

SUMMARY OF THE INVENTION

The object of the present invention is to provide an image processing apparatus, an image processing method and an image processing program capable of cutting down the processing time in image processing based on the anti-correlation digital halftoning technique.

The aforementioned object can be achieved by the configuration having the following features:

(1) An image processing apparatus including an arithmetic processing section for quantizing multi-density level image data and converting the image data into digital halftone image data for outputting, the arithmetic processing section being configured to:

create a plurality of quantized patterns to determine a dot occurrence information sequence, based on a given initial quantized pattern, such that anti-correlation is increased with respect to the dot occurrence information sequence for a pixel that has already been quantized;

add the plurality of quantized patterns to form a dither mask; and quantize the multi-density level image data by using the dither mask.

(2) An image processing method for quantizing multi-density level image data and converting the image data into digital halftone image data for outputting, the image forming method comprising:

creating a plurality of quantized patterns to determine a dot occurrence information sequence, based on a given initial quantized pattern, such that anti-correlation is increased with respect to a dot occurrence information sequence for a pixel that has already been quantized;

adding the plurality of quantized patterns to form a dither mask; and quantizing the multi-density level image data by using the dither mask.

(3) A program for quantizing multi-density level image data and converting the image data into digital halftone image data for outputting, the program allowing a computer to execute an image processing comprising the steps of:

creating a plurality of quantized patterns to determine a dot occurrence information sequence, based on a given quantized initial pattern, such that anti-correlation is increased with respect to a dot occurrence information sequence for a pixel that has already been quantized;

adding the plurality of quantized patterns to form a dither mask; and quantizing the multi-density level image data by using the dither mask.

According to the invention described in (1), (2) and (3), in the image processing for quantizing multi-density level image data and converting it into the digital halftone image data for outputting, a dither mask is created by adding a plurality of patterns having been quantized to determine a dot occurrence information sequence such that the anti-correlation is increased with respect to the dot occurrence information sequence for the pixel that has already been quantized, based on a desired initial pattern; and the multi-density level image data is quantized using this dither mask. Once the dither mask has been created, the digital halftone image data for outputting having superb dot dispersion can be obtained from the multi-density level image data, using the aforementioned dither mask, without further complicated calculation, with the result that image processing time is reduced.

BRIEF DESCRIPTION OF THE DRAWINGS

FIGS. 6(*a*) through 6(*c*) are diagrams representing the quantization of multi-density level image data by a dither mask;

FIGS. 7(*a*) through 7(*c*) are diagrams representing the result of quantizing the multi-density level image data by a dither mask;

FIGS. 14(*a*) and 14(*b*) are diagrams showing generation of Hi and j[k].

DETAILED DESCRIPTION OF THE PREFERRED EMBODIMENT

The following describes the anti-correlation digital halftoning technique specific examples: In the following description, it is assumed that processing is applied by switching a relevant image from left to right.

Figure 9:
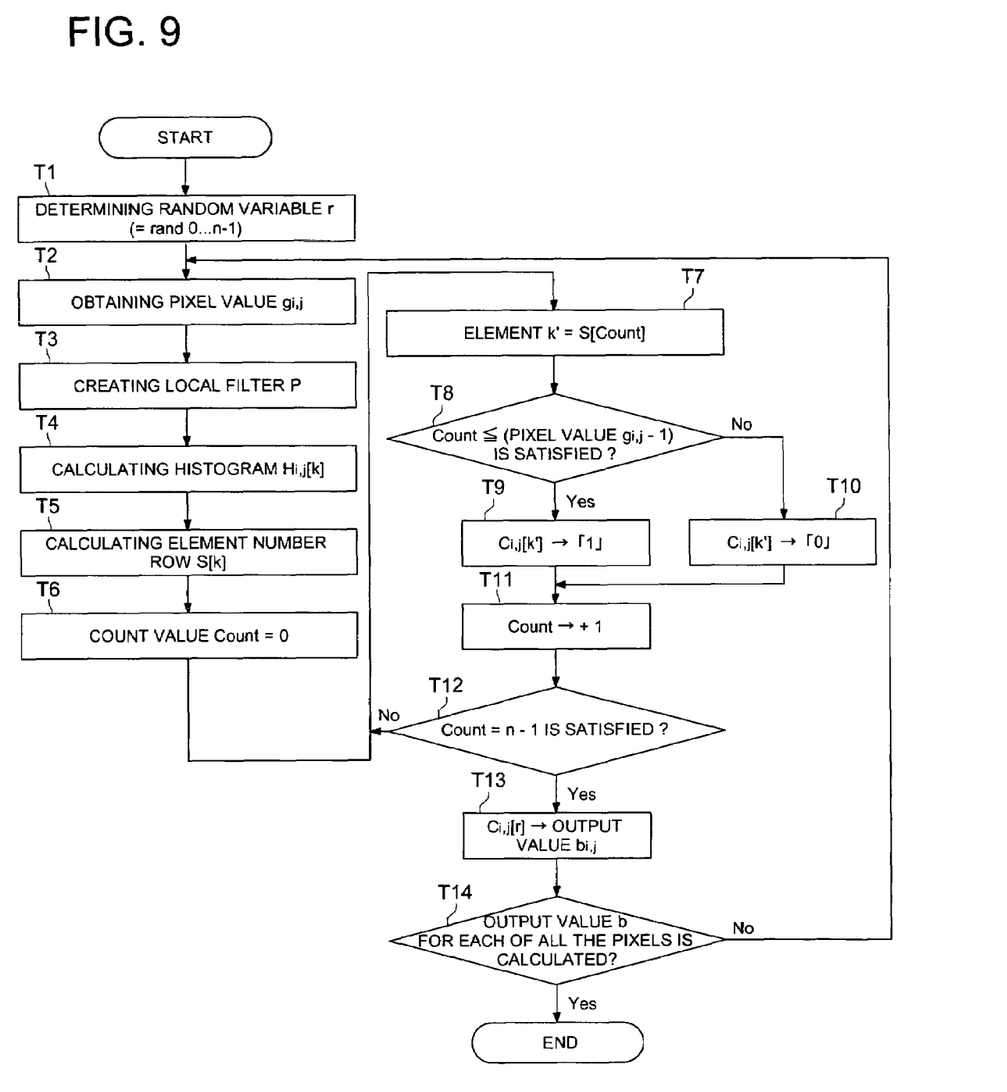
FIG. 9 is a flowchart for chronological representation of the image processing according to the prior art anti-correlation digital halftoning technique.

As shown in FIG. 9, in the image processing by the anti-correlation digital halftoning technique, a random variable r (where r is an integer) is determined on a random basis in the range 0 through (n−1) before an original image data (multi-density level image data) is inputted (Step T1). It should be noted that "n" denotes the maximum value of pixel value $g_{i,j}$. The pixel value $g_{i,j}$ denotes a gradation value of the pixel located in the i-th row and j-th column. Here $g_{i,j}$ refers to a value ranging from 0 through n.

After the original image data has been inputted, the pixel value $g_{i,j}$ for the pixel in the i-th row and j-th column (relevant pixel) is obtained from the original image data (Step T2).

Figure 10:
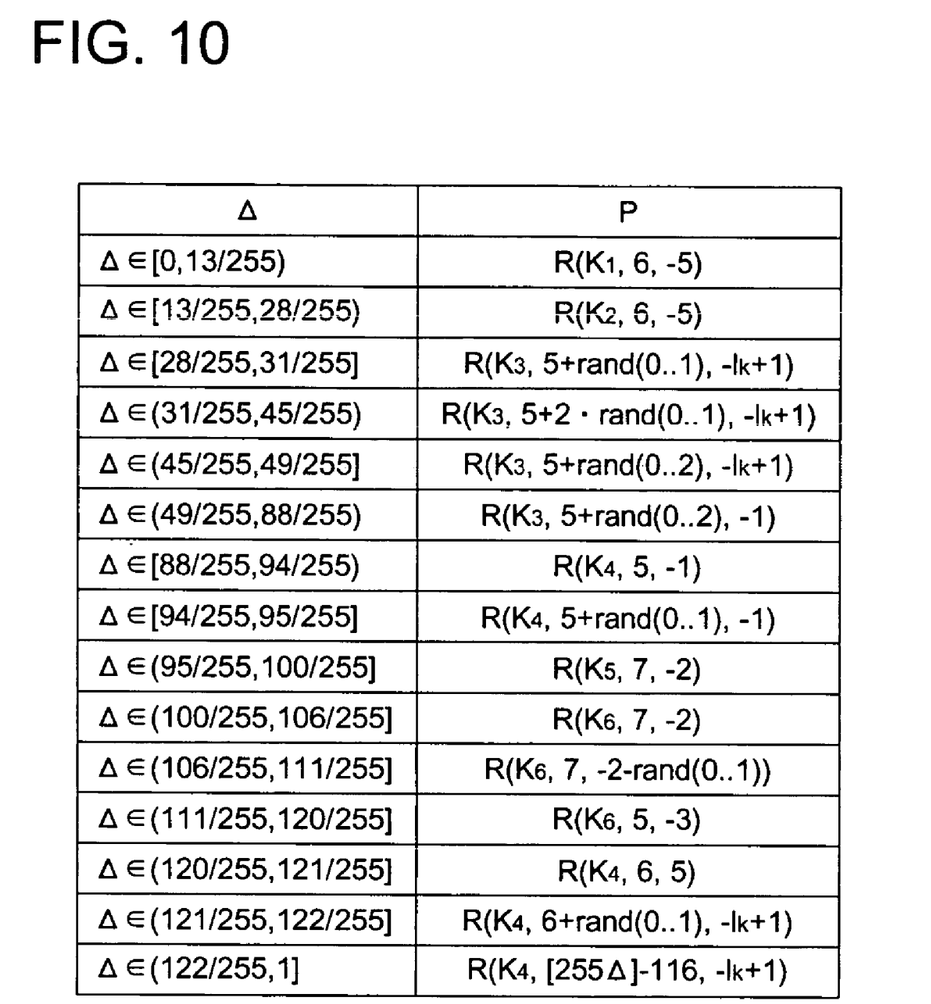
FIG. 10 is a table showing the correspondence between the value $\Delta$ based on the pixel value and information on local filter P.

After pixel value $g_{i,j}$ has been obtained, the local filter P of the pixel in the i-th row and j-th column is generated (Step T3). To put it more specifically, pixel value $g_{i,j}$ is substituted into the following formula to obtain $\Delta$ and to determine the range in the left column of FIG. 10 where the $\Delta$ is located. The information on the local filter P corresponding to the specified range is specified from the right column of FIG. 10. In the Figure, the [$\Delta \in (0, 13/255)$], for example, indicates $0 \leq \Delta < 13/255$.

$$\Delta = |g_{i,j} - n/2|/n \quad (1)$$

If the pixel value $g_{i,j}$ is 120, $\Delta = |120 - 255/2|/255 = 7.5/255$ is derived from the aforementioned equation. This $\Delta \in [0, 13/255]$ can be specified to belong to the $\Delta \in [0, 13/255]$ described in the topmost column of the left column in FIG. 10. From the specified column where $\Delta \in [0, 13/255]$ is described, R ($K_1$, 6, −5) in the column arranged on the right side can be specified as information of the local filter P.

Figure 11:
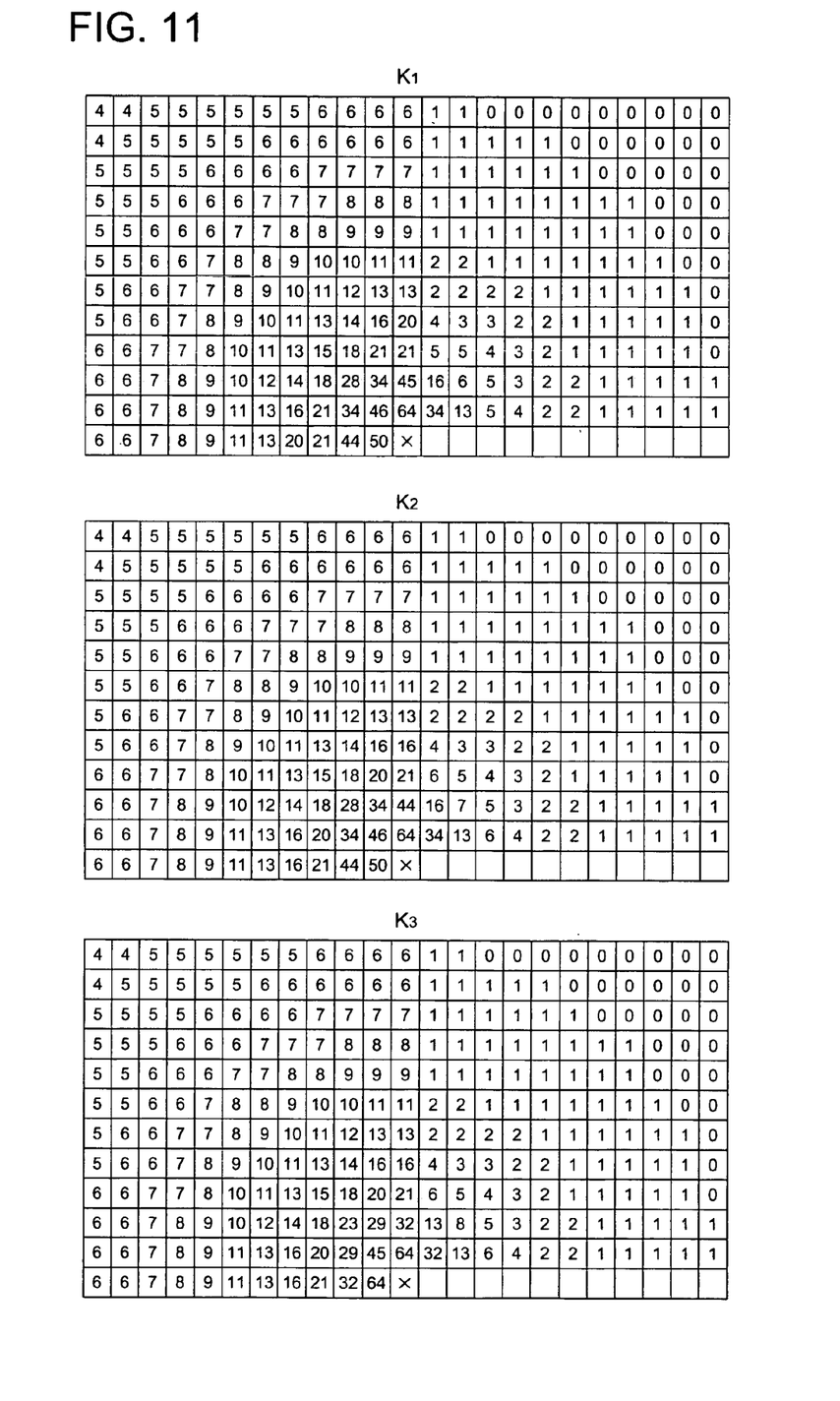
FIG. 11 is a diagram showing base filters $K_1$ through $K_3$.
Figure 12:
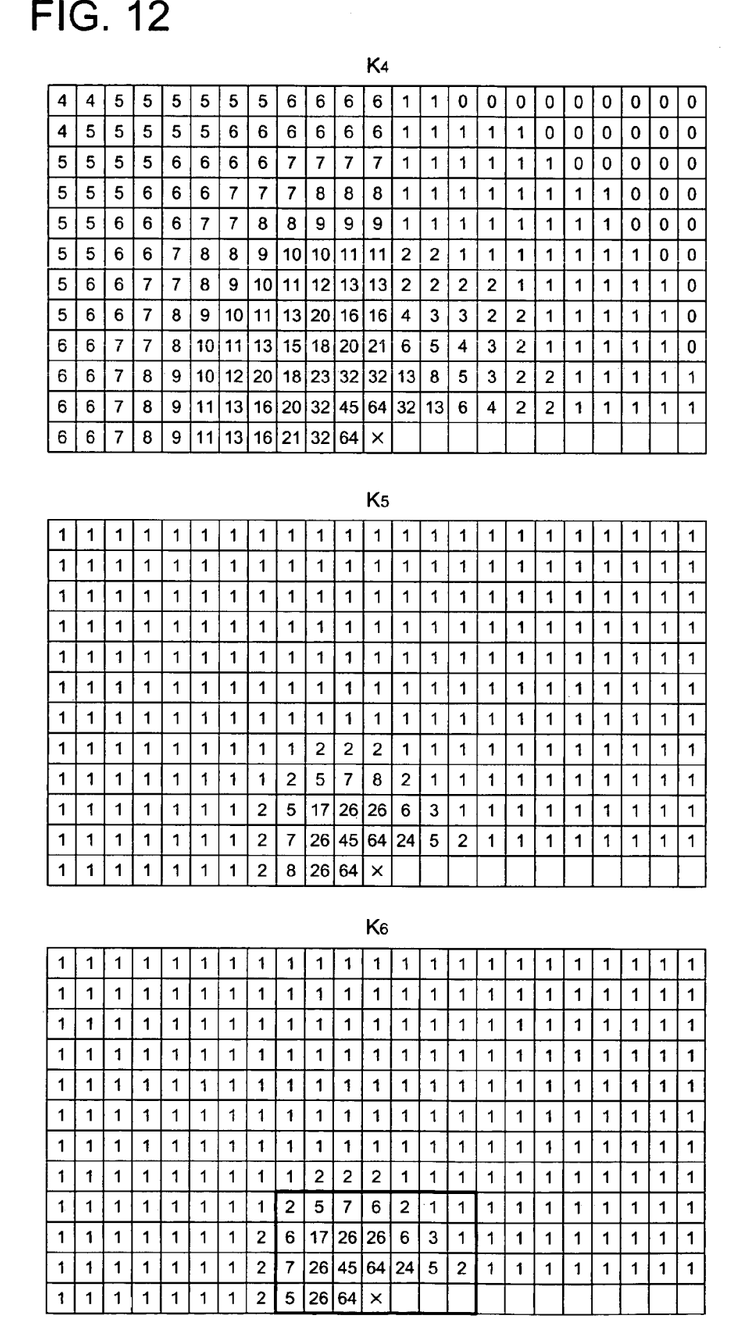
FIG. 12 is a diagram showing base filters $K_4$ through $K_6$.

When the specified information is generalized as "R (K, 1k, $\epsilon$ (1k)" for the sake of expediency, reference is made to "K" at first. Any one of six basic filters $K_1$ through $K_6$ shown in FIGS. 11 and 12 is selected. Then reference is made to "1k" to generate a filter having a width of (1k−1) pixel in the upward, leftward and rightward directions, from the x-marked pixel in the basic filter K, viz., the pixel in the i-th row and j-th column. Then the 1k and $\epsilon$ (1k) are referenced to assign the pixel value of the basic filter K directly to each of the pixels from the first column through the (1k−$\epsilon$(1k)) column in the generated filter, whereby the local filter P is generated.

Figure 13:
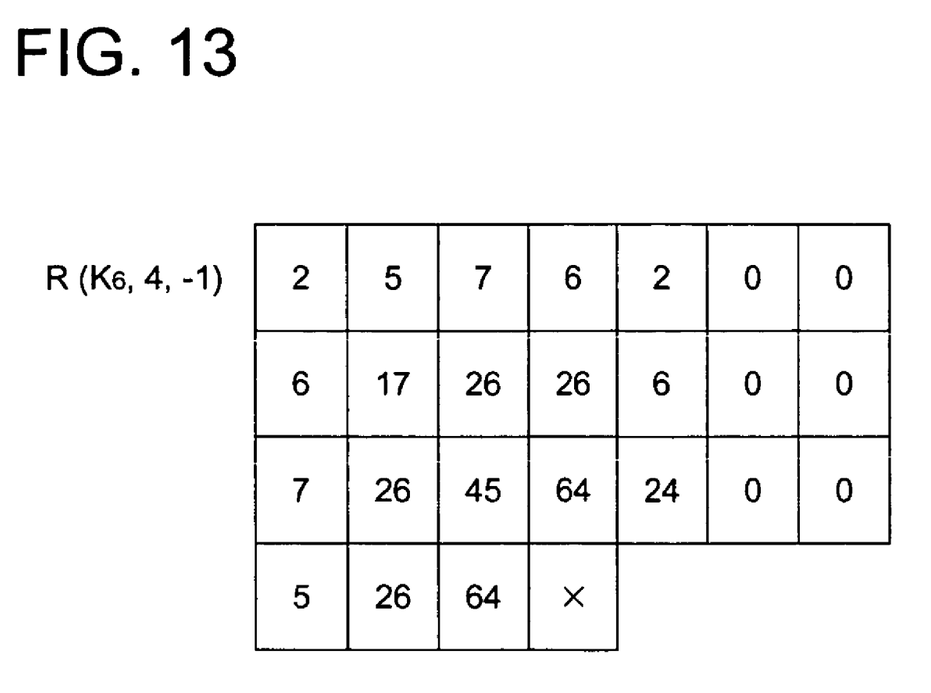
FIG. 13 is a diagram showing a local filter P (=R ($K_6$, 4, −1))

If the information of the local filter P is represented by R ($K_6$, 4, −1), the local filter P is generated according to the following procedure. To put it another way, since the one corresponding to the basic filter K in R ($K_6$, 4, −1) is "$K_6$", the basic filter $K_6$ illustrated in the lower stage is specified as the basic filter K from the three basic filters $K_4$ through $K_6$ of FIG. 12. Since the one corresponding to the 1k is "4" in the R ($K_6$, 4, −1) and the one corresponding to $\epsilon$ (1k) is "−1", the filter, with a width of 3 (=1k−1) pixels in the upward, leftward and rightward direction, having a size of 4 rows by 7 (=2×4−1) columns is generated from the X-marked basic filter $K_6$ in the lower stage of FIG. 12 in the first place. Then in the generated filter of 4 rows by 7 columns, the pixel value of the basic filter $K_6$ is assigned directly to each of the pixels from the 1st column to 5th (=4−(−1)) columns, and "0" is assigned to each of the pixels from 5th column and thereafter. FIG. 13 shows the local filter P generated in this procedure.

After the local filter P has been generated, the histogram $H_{i,j}[k]$ of the pixel in the i-th row and j-th column is calculated (Step T4). The "histogram $H_{i,j}[k]$" can be defined as follows: When the layout position of the pixels around the relevant pixel shown by the x-mark is expressed in (x, y), the dot occurrence pattern $C_{x,y}[k]$ of each pixel around e relevant pixel is weighted by the value in the position (x, y) of the local filter P. In this case, the sum (expected value) obtained by adding for each value of the element th (element number) k is the "histogram $H_{i,j}[k]$". However, in this case, "k" denotes a given integer from 0 to (n−1), and is synonymous with the element (element number) k of the dot occurrence pattern $C_{x,y}$ "k". Further, the dot occurrence pattern $C_{i,j}[k]$" is the basic series (dot occurrence information sequence) consisting of $C_{i,j}[0]$ through $C_{i,j}[n-1]$, each of which is assigned with 0 or 1. This dot occurrence pattern $C_{i,j}[k]$" signifies that a dot is formed in the pixel in the i-th row and j-th column if "1" is obtained when any one of the value from 0 to (n−1) is substituted into the dot occurrence pattern $C_{i,j}[k]$", and no dot is formed if "0" is obtained.

Figure 14A:
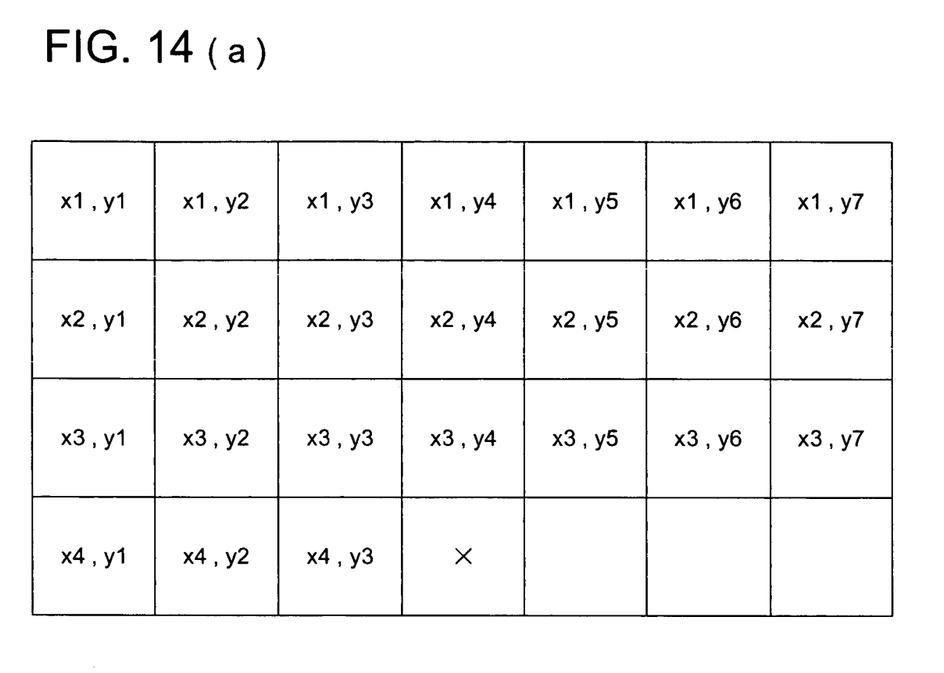
Figure 14B:
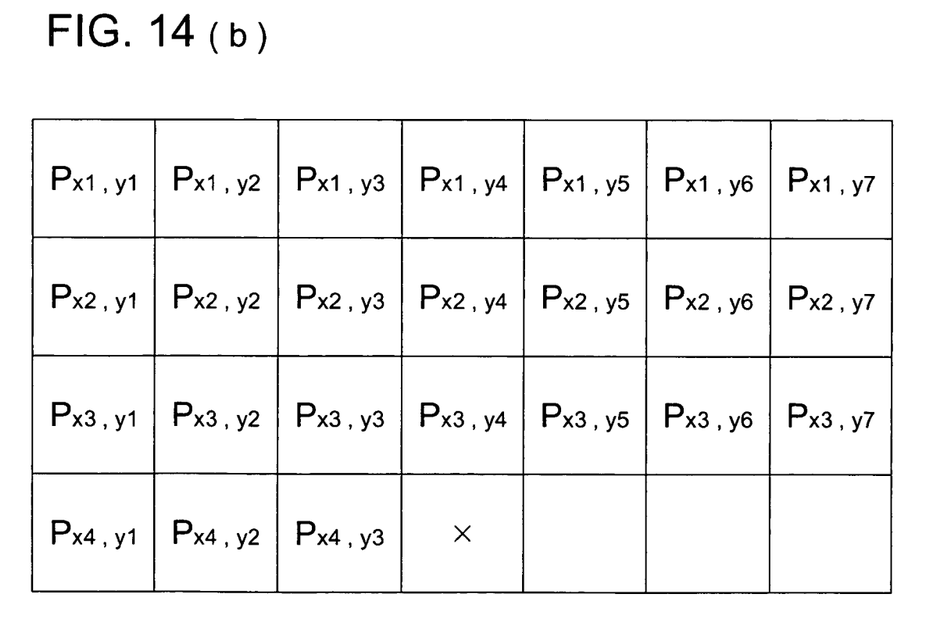

When the local filter P shown in FIG. 13 is generated, and the position (x, y) of each pixel in the local filter P and the pixel value $P_{x,y}$ of each pixel in the local filter P are set as shown in FIGS. 14(a) and (b), then the histogram $H_{i,j}[k]$ of the relevant pixel (X-marked pixel in FIGS. 13 and 14) in the i-th row and j-th column is calculated for each value of the element (element number) k, according to the following equation.

$$H_{i,j}[0]=C_{x1,y1}[0]\times p_{x1,y1}+C_{x1,y2}[0]\times p_{x1,y2}+C_{x1,y3}[0]\times p_{x1,y3}+\ldots+C_{x4,y3}[0]\times p_{x4,y3}$$

$$H_{i,j}[1]=C_{x1,y1}[1]\times p_{x1,y1}+C_{x1,y2}[1]\times p_{x1,y2}+C_{x1,y3}[1]\times p_{x1,y3}+\ldots+C_{x4,y3}[1]\times p_{x4,y3}$$

$$H_{i,j}[2]=C_{x1,y1}[2]\times p_{x1,y1}+C_{x1,y2}[2]\times p_{x1,y2}+C_{x1,y3}[2]\times p_{x1,y3}+\ldots+C_{x4,y3}[2]\times p_{x4,y3}$$

...

...

$$H_{i,j}[n-1]=C_{x1,y1}[n-1]\times p_{x1,y1}+C_{x1,y2}[n-1]\times p_{x1,y2}+C_{x1,y3}[n-1]\times p_{x1,y3}+\ldots+C_{x4,y3}[n-1]\times p_{x4,y3}$$

Histograms $H_{i,j}[0]$ through $H_{i,j}[n-1]$ calculated for each element k are rearranged in the ascending order to calculate the element number row S [k] of the histogram $H_{i,j}[k]$ (Step T5).

For example, if the histograms $H_{i,j}[0]$ through $H_{i,j}[n-1]$ are rearranged in the order of $H_{i,j}[8]<H_{i,j}[3]<H_{i,j}[4]<H_{i,j}[1]<H_{i,j}[5]<\ldots H_{i,j}[n-1]$, the element number row S [k] will be calculated as {8, 3, 4, 1, 5 ..., (n−1)}. In this case, "8" in the element number row S [k] indicates a 0-th element, and "3" denotes the 1st element.

After the element number row S [k] has been calculated, the counter value Count is set to "0" (Step T6). The value of the element S [Count] in the sequence corresponding to the value of the counter value Count in the element number row S [k] is substituted into to the element k' of the element number row S [k] (Step T7). In other words, to take an example from the aforementioned element number row S [k] (={8, 3, 4, 1, 5 ..., (n−1)}, since the count value Count is 0, 8 (=S [0]) is substituted into k'.

Then the counter value Count and pixel value $(g_{i,j}-1)$ are compared in magnitude (Step T8).

If the counter value Count does not exceed the pixel value $(g_{i,j}-1)$ as a result of comparison, the dot occurrence pattern $C_{i,j}[k']$ corresponding to k' is set to "1" (Step T9). If it is greater in magnitude, it is set to "0" (Step T10). For example, if the pixel value $g_{i,j}$ is 3 and element number i, j [k] is {8, 3, 4, 1, 5 ... (n−1)}, the element $C_{i,j}[8]$ out of the dot occurrence pattern $C_{i,j}[k]$" is set to "1".

On termination of the processing in Step T9 or T10, "1" is added to the counter value Count (Step T11). Comparison is made between the counter values Count (=1) and (n−1) for magnitude (Step T12). The processing from step T7 through step T11 is repeated until the counter value Count reaches (n−1), whereby the dot occurrence pattern $C_{i,j}[k']$ is determined. This arrangement allows "1" to be set to the elements $C_{i,j}[8]$, $C_{i,j}[3]$ and $C_{i,j}[4]$. After the dot occurrence pattern $C_{i,j}[k]$ has been set, the $C_{i,j}[r]$ where the random variable r determined in the aforementioned step T1 is assumed as the element number, out of the dot occurrence pattern $C_{i,j}[k]$, is calculated as the output value $b_{i,j}$ of the pixel in the i-th row and j-th column (Step T13). The output value $b_{i,j}$ is "0" or "1", as can been seen from the processing applied in the aforementioned step T9 or T10.

After the output value $b_{i,j}$ has been calculated, a check is made to determine whether or not the output value b is calculated for all the inputted original image data (Step T14). If it has been determined that the output value b has not been calculated for all the pixels (Step T14), processing from the aforementioned Steps T2 through T13 is repeated for each of the unprocessed pixels. If it has been determined that the output value b of all pixels, viz., digital halftone image data for outputting has been calculated, processing terminates.

According to the image processing based on anti-correlation digital halftoning technique, when attention is paid to one particular pixel, occurrence of the dot of each pixel substantially maximizes the anti-correlation with the surrounding pixels. This arrangement improves the dispersion of the dots formed on the recording medium at the time of image recording. Thus, the anti-correlation digital halftoning technique is characterized the scarcity of specific textures—a feature observed in the error diffusion method.

It should be added that the dot occurrence pattern of the surrounding pixels outside the image area is required in order the dot occurrence pattern $C_{i,j}[k]$. For the surrounding pixels outside the image area, the dot occurrence pattern is determined by using the random variable or the like. To put it more specifically, it is defined as follows: $C_{i,j}[k]=1$ (where rBR<nΔ), 0 (otherwise) where $\Delta=|g_{i,j}-n/2|/n$, and "$g_{i,j}$" is the pixel value of the relevant pixel. Further, "rBR" indicates the random integer included in (0, 1, . . . (int) (n/2)), and is different every time.

However, according to the prior art image processing based on the anti-correlation digital halftoning technique, it is necessary to carry out additions in the number equivalent to the number of chambers by mask size or more at the time of calculation of the histogram, and to apply sorting processing thereafter. Especially when the image consists of a great number of bits, a very long time is required. Such a disadvantage has been pointed out in this prior art method.

The Preferred Embodiment

Referring to the diagrams, the following describes the image processing apparatus, image processing method and image processing program as embodiments in the present invention, without the present invention being restricted to these embodiments:

The image processing apparatus 1 of the present embodiment will be described first.

Figure 1:
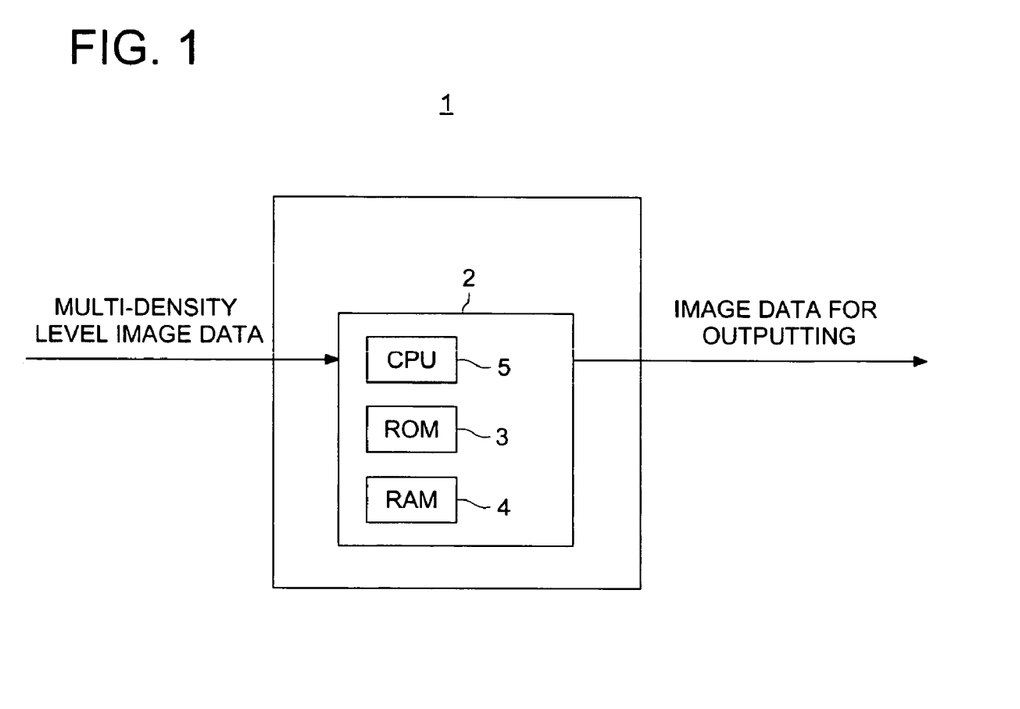
FIG. 1 is a block diagram representing the schematic configuration of an image processing apparatus according to the present invention.

FIG. 1 is a block diagram showing the schematic configuration of the image processing apparatus 1. As shown in FIG. 1, the image processing apparatus 1 is equipped with an arithmetic processing section 2 for quantizing multi-density level image data and converting it into the digital halftone image data for outputting. This image processing apparatus 1 can be mounted on the well-known output apparatus such as an inkjet printer. In the present embodiment, the multi-density level image data will be described as the data on the monochromatic image where each pixel element has an 8-bit gray-scale. Further, in the present embodiment, the 8-bit (256-gradation) multi-density level image data is quantized in two levels (values)—0 (not recorded) and 1 (dot recorded)—for each pixel.

The arithmetic processing section 2 (computer) is equipped with the ROM (Read Only Memory) 3, RAM (Random Access Memory) 4 and CPU (Central Processing Unit) 5.

The ROM 3 stores the image processing program of the present invention. This image processing program allows the arithmetic processing section 2 to apply the processing of anti-correlation digital halftoning to the multi-density level image data.

The RAM 4 is equipped with a work area for the CPU 5.

The CPU 5 allows the image processing program stored in the ROM 3 to be expanded in the work area of the RAM 4, whereby an image for outputting is generated from the multi-density level image data.

Figure 2:
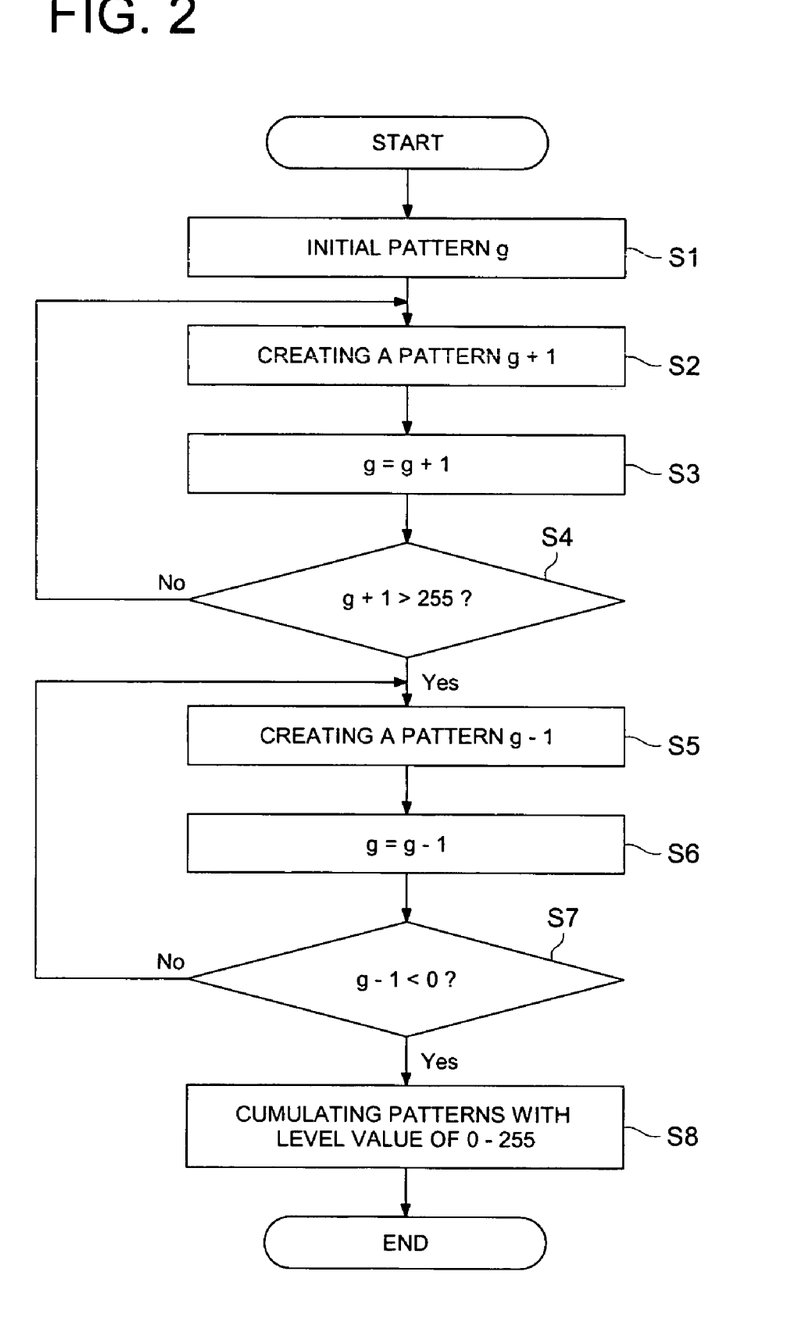
FIG. 2 is a flowchart for chronological representation of a dither mask creation process carried out by the arithmetic processing section of the image processing apparatus.

Referring to FIG. 2, the following describes the image processing method according to the present invention.

FIG. 2 is a flowchart for chronological representation of the process of creating a dither mask for being used to generate the monochromatic binary image data, by the arithmetic processing section 2 of the image processing apparatus 1, based on the aforementioned image processing program.

In the dither mask creation process, an initial pattern is prepared first (Step S1). The initial pattern is a binary pattern created by anti-correlation digital halftoning technique from the sold image of a desired level value g.

Then a binary pattern g+1 having a greater level value than the initial pattern is created based on this initial pattern g (Step S2).

Figure 3:
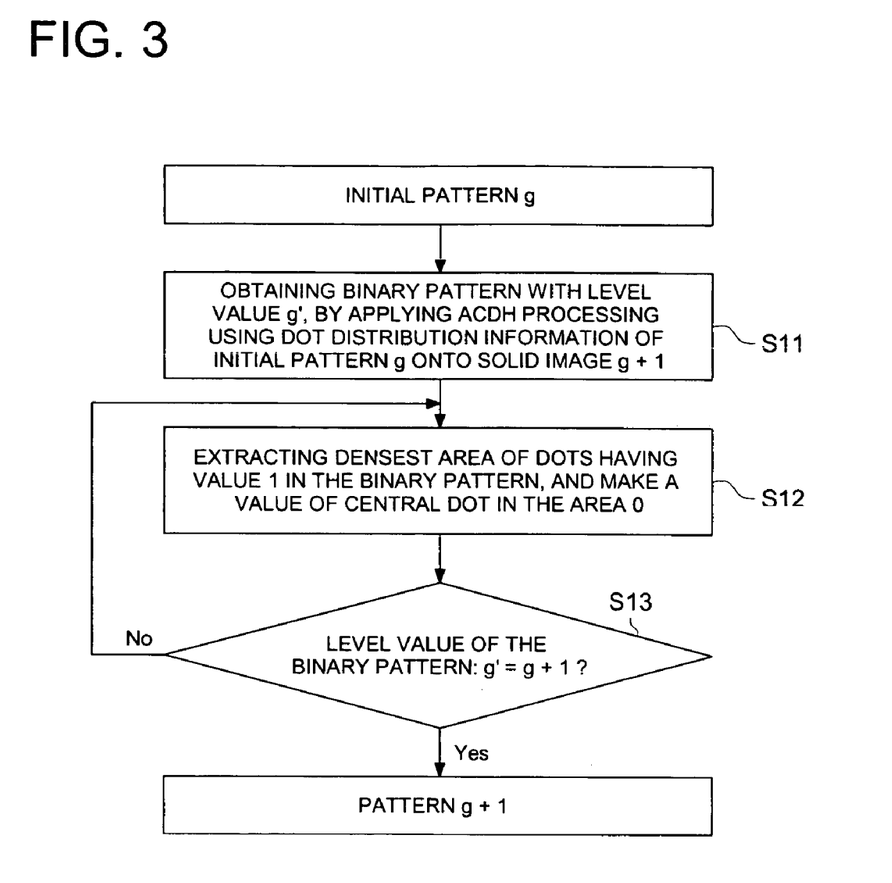
FIG. 3 is a flowchart for chronological representation of a process of creating a pattern having a greater level than the initial pattern, in the dither mask creation process.
Figure 7A:
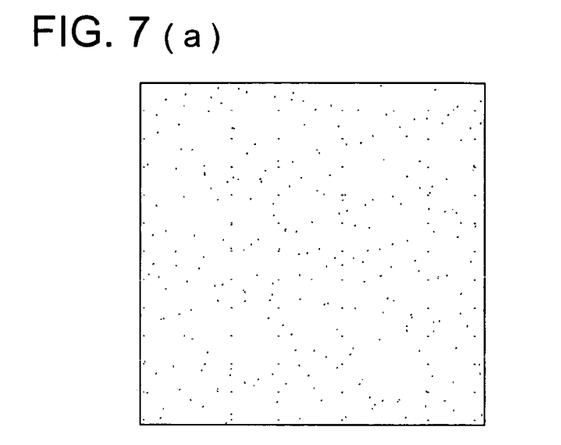
Figure 7B:
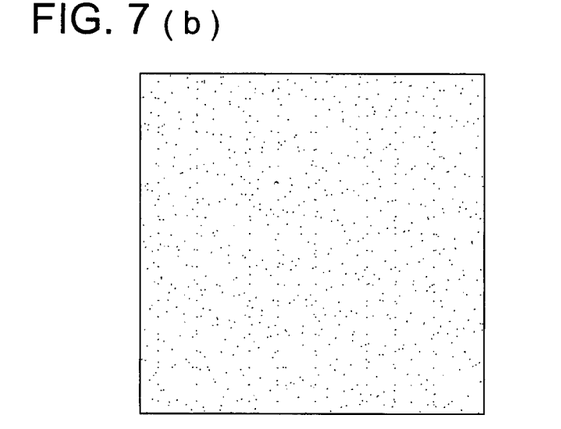
Figure 8:
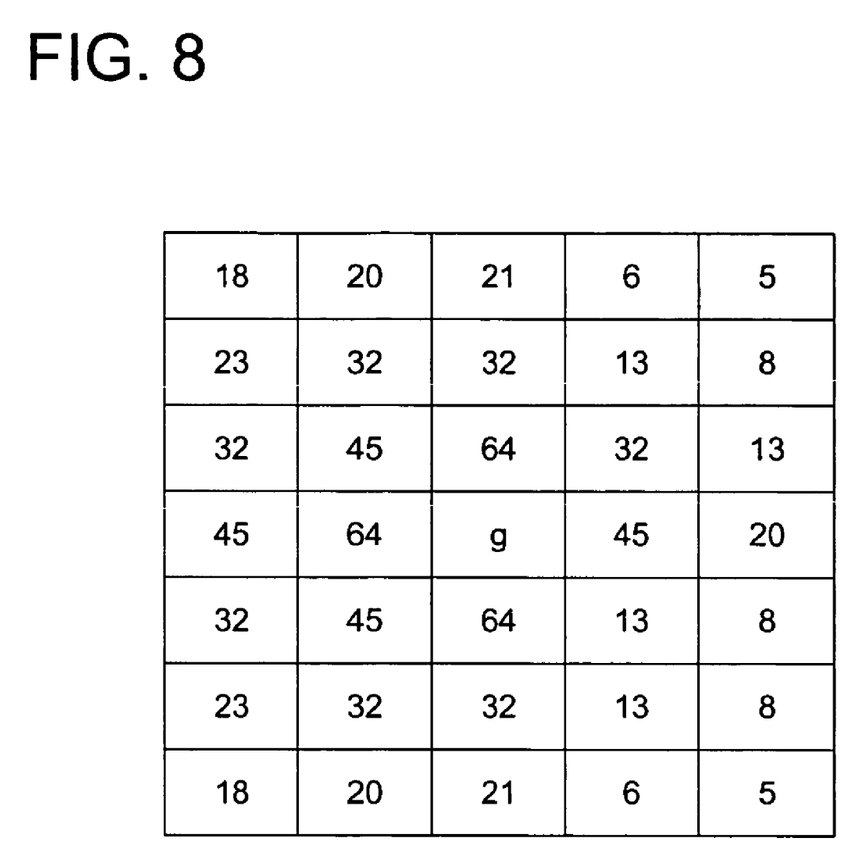
FIG. 8 is a diagram showing one mask pattern in the dither mask creation process.

FIGS. 2 and 3 will be used in the following description:

A solid image of binary pattern g+1 is created and processing of anti-correlation digital halftoning is applied to it (Step S11). In this case, the dot as 1 in the pattern g is stored unchanged in the pattern g+1. A filter shown in FIG. 8 is used in the calculation of the histogram. The chamber information of the dot of the pattern g is used for the portion where the processing of anti-correlation digital halftoning is not yet applied. In this manner, a binary pattern is created from the solid image where the level value is g+1 as shown in FIG. 7(b), by the initial pattern shown in FIG. 7(a).

Figure 7C:
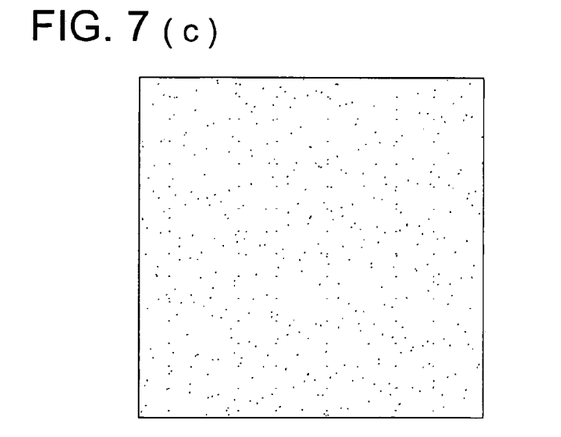

As described above, after the dot as 1 in the pattern g has been stored, the processing of anti-correlation digital halftoning is applied. Accordingly, the level value g' of the binary pattern obtained from the solid image having the level value g+1 is greater than g+1. Thus, in order to turn the level value to g+1, the excess dot having value 1 is deleted (Step S12). In this case, the portion where the dots 1 are most concentrated is detected and the value of the dot located at the center thereof is set to 0. A specific example can be found in the case where a low pass filter is applied to the pattern g' in the frequency range, and "0" is assigned to the dot value having the maximum value out of the filtered output values. Step S12 is repeated until the level value of this pattern reaches g+1 (Step S13). In this manner, a binary pattern characterized by excellent dispersion property as shown in FIG. 7(c) is created from the binary pattern having many adjacent dots as shown in FIG. 7(b).

The pattern g+1 is assumed as the initial pattern (Step S3) and the next pattern g+2 is created in the aforementioned procedure.

Figure 5:
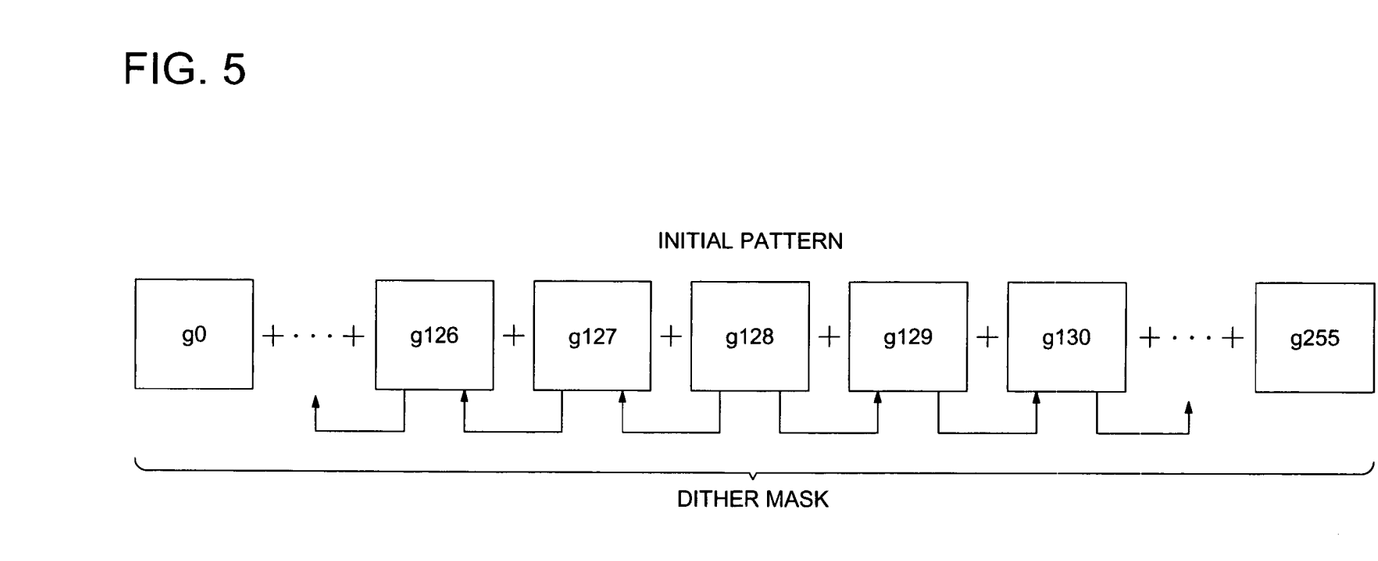
FIG. 5 is a drawing showing the creation of each pattern in the dither mask creation process.

In this way, the pattern having the level values g+1 through 255 is crated as shown in FIG. 5 (Step S4).

A binary pattern g−1 where the level value is smaller than that of the initial pattern is created based on the aforementioned initial pattern g (Step S5).

Figure 4:
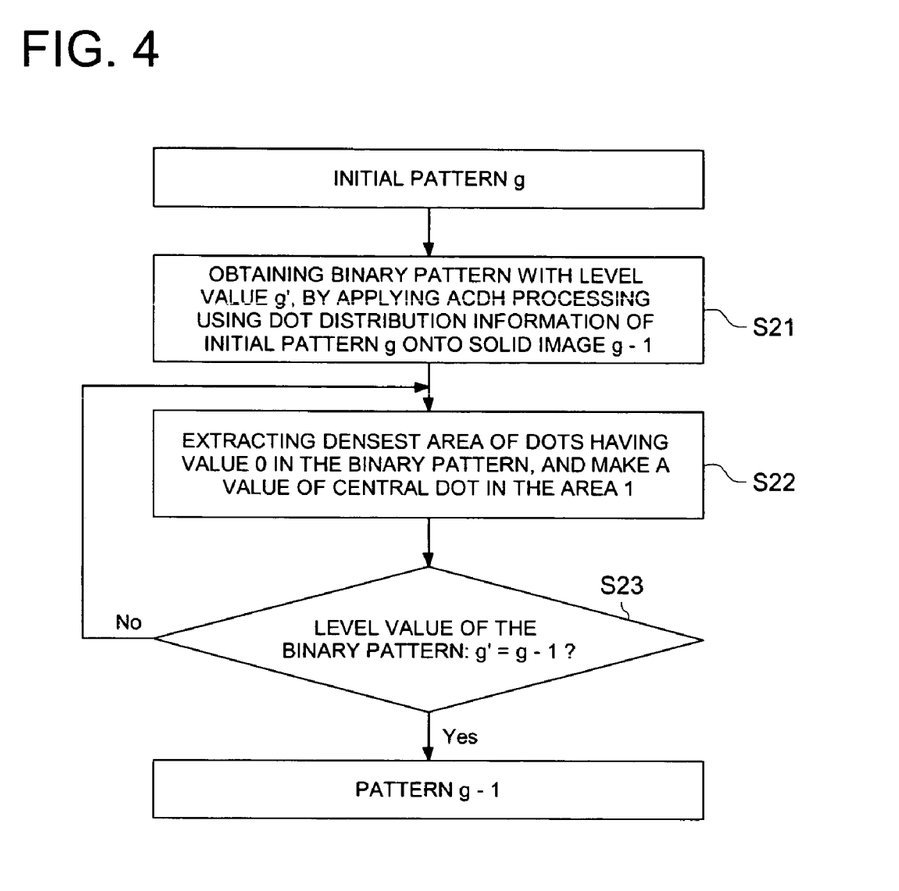
FIG. 4 is a flowchart for chronological representation of a process of creating a pattern having a smaller level than the initial pattern, in the dither mask creation process.

The following description is based on FIGS. 2 and 4.

A solid image of level value g−1 is prepared, and processing of anti-correlation digital halftoning is applied (Step S21). In this case, the dot as 0 in the pattern g is stored unchanged in the pattern g−1. Further, the filter shown in FIG. 8 is used in the calculation of the histogram. The chamber information of the dot of the pattern g is used for the portion where the processing of anti-correlation digital halftoning is not yet applied. In this manner, a binary pattern is created from the solid image where the level value is g−1 as shown in FIG. 8, by the initial pattern.

As described above, after the dot as 0 in the pattern g has been stored, processing of the anti-correlation digital halftoning is applied. Thus, the level g' of the binary pattern obtained from the solid pattern of level value g−1 is smaller than g−1. Accordingly, in order to make the level value g−1, the excess dot 0 is deleted (Step S22). In this case, the portion where the dots 0 are most concentrated is detected and the value of the dot located at the center thereof is set to 1. A specific example can be found in the case where a low pass filter is applied to the pattern g' in the frequency range, and "1" is assigned to the dot value having the minimum value out of the filtered output values. Step S22 is repeated until the level value of this pattern reaches g−1 (Step S23). In this manner, a binary pattern, characterized by excellent dispersion property, having a level value of g−1 is created.

After that, pattern g−1 is used as an initial pattern (Step S6), and the following pattern g−2 is created according to the aforementioned procedure.

In this way, the patterns having level values g−1 through 0 are created, as shown in FIG. 5 (Step S7).

The value in the same dot is added to the binary patterns having level values 0 through 255 having been created in the aforementioned procedure (Step S8) and the obtained matrix is used as a dither mask.

Figure 6A:
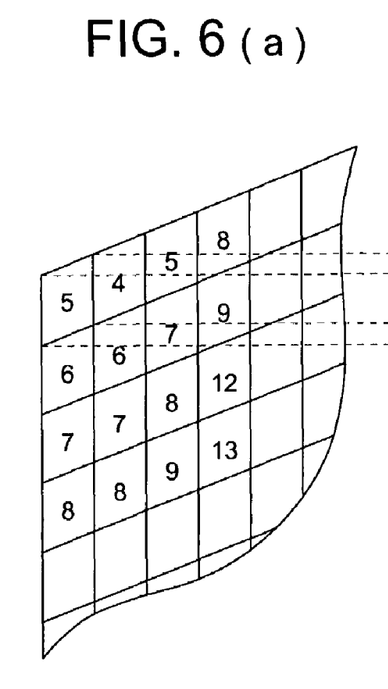
Figure 6B:
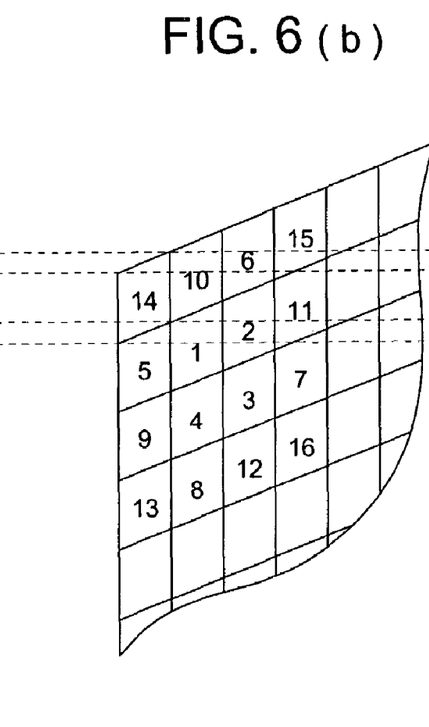
Figure 6C:
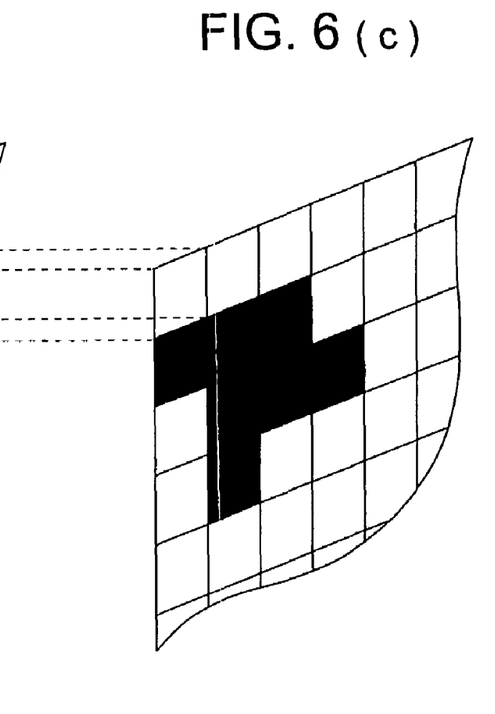

As shown in FIG. 6, the aforementioned dither mask (matrix shown in (b)) is applied to the matrix shown in the multi-density level image data (a). This arrangement produces the binary pattern image data (matrix shown in (c)). In the present embodiment, when the multi-density level image data value is greater than the dither mask value, 1 (dot recorded) is added in the binary image data. When the multi-density level image data value is smaller than the dither mask value, 0 (not recorded) is added in the binary image data.

As described above, the image processing apparatus image processing method and image processing program according to the present invention provide image processing of quantizing multi-density level image data and converting it into the digital halftone image data for outputting, wherein a dither mask is created by adding a plurality of patterns having been quantized to determine a dot occurrence information sequence such that the anti-correlation is increased with respect to the dot occurrence information sequence for the pixel that has already been quantized, and the multi-density level image data is quantized using this dither mask, based on a desired initial pattern consisting of multi-density level image data. Once the dither mask has been created, the digital halftone image data for outputting having superb dot dispersion can be obtained from the multi-density level image data, using the aforementioned dither mask, without further complicated calculation, with the result that image processing time is reduced.

The present invention can be embodied in a great number of variations with appropriate improvement or design changes, without departing from the technological spirit and scope of the invention claimed.

For example, in the present embodiment, the present invention is applied to the multi-density level image data for monochromatic image. Without being restricted thereto, it can be applied to the multi-density level image data for color image, in response to a great variety of images.

In the present embodiment, a square filter is used as a coefficient filter for calculation of the histogram. Without being restricted thereto, a coefficient filter of other than square forms can be used in response to a great variety of images.

Further, a binary pattern other than the solid image pattern can be used as an initial pattern.

What is claimed is:

1. An image processing apparatus comprising an arithmetic processing section for quantizing multi-density level image data and converting the image data into digital halftone image data for outputting, the arithmetic processing section comprising:
    means for creating an initial quantizing pattern to determine a dot occurrence sequence for an initial level value among level values of the multi-density level image;
    means for creating a plurality of quantized patterns for each level value of the multi-density level image to determine a dot occurrence information sequence, based on a preceding quantized pattern which has been created, such that anti-correlation is increased with respect to the dot occurrence information sequence for a pixel of the level value that has already been quantized;
    means for adding the plurality of quantized patterns corresponding to all the level values of the multi-density level image to form a dither mask; and
    means for quantizing the multi-density level image data by using the dither mask.

2. The image processing apparatus of claim 1, wherein when the initial quantized pattern is a dot occurrence information sequence pattern of level value g, a dot occurrence information sequence pattern of level value g+n is created such that anti-correlation is increased with respect to the dot occurrence information sequence for a pixel of level value g+n−1, and a dot occurrence information sequence pattern of a pixel of level value g−m is created such that anti-correlation is increased with respect to the dot occurrence information sequence for a pixel of level value g−m+1,
    where g+n<N, g−m≧0, N denotes the number of gradation levels of the multi-density level image data, and each of g, n, m, and N denotes a natural number.

3. An image processing method for quantizing multi-density level image data and converting the image data into digital halftone image data for outputting, the image forming method comprising:
    creating an initial quantizing pattern to determine a dot occurrence sequence for an initial level value among level values of the multi-density level image;
    creating a plurality of quantized patterns for each level value of the multi-density level image to determine a dot occurrence information sequence, based on a preceding quantized pattern which has been created, such that anti-correlation is increased with respect to a dot occurrence information sequence for a pixel of the level value that has already been quantized;
    adding the plurality of quantized patterns corresponding to all the level values of the multi-density level image to form a dither mask; and
    quantizing the multi-density level image data by using the dither mask.

4. The image processing method of claim 3, wherein when the initial quantized pattern is a dot occurrence information sequence pattern of level value g, a dot occurrence information sequence pattern of level value g+n is created such that anti-correlation is increased with respect to the dot occurrence information sequence for a pixel of level value g+n−1, and a dot occurrence information sequence pattern of a pixel of level value g−m is created such that anti-correlation is increased with respect to the dot occurrence information sequence for a pixel of level value g−m+1,
    where g+n<N, g−m≧0, N denotes the number of gradation levels of the multi-density level image data, and each of g, n, m, and N denotes a natural number.

5. A computer-readable storage medium stored therein a program for quantizing multi-density level image data and converting the image data into digital halftone image data for outputting, the program allowing a computer to execute an image processing comprising:
    creating an initial quantizing pattern to determine a dot occurrence sequence for an initial level value among level values of the multi-density level image;
    creating a plurality of quantized patterns for each level value of the multi-density level image to determine a dot occurrence information sequence, based on a preceding quantized pattern which has been created, such that anti-correlation is increased with respect to a dot occurrence information sequence for a pixel of the level value that has already been quantized;
    adding the plurality of quantized patterns corresponding to all the level values of the multi-density level image to form a dither mask; and
    quantizing the multi-density level image data by using the dither mask.

6. The computer-readable storage medium of claim 5, wherein when the initial quantized pattern is a dot occurrence information sequence pattern of level value g, a dot occurrence information sequence pattern of level value g+n is created such that anti-correlation is increased with respect to the dot occurrence information sequence for a pixel of level value g+n−1, and a dot occurrence information sequence pattern of a pixel of level value g−m is created such that anti-correlation is increased with respect to the dot occurrence information sequence for a pixel of level value g−m+1,
    where g+n<N, g−m≧0, N denotes the number of gradation levels of the multi-density level image data, and each of g, n, m, and N denotes a natural number.

* * * * *